United States Patent
Koladi et al.

(10) Patent No.: US 9,870,246 B2
(45) Date of Patent: Jan. 16, 2018

(54) SYSTEMS AND METHODS FOR DEFINING VIRTUAL MACHINE DEPENDENCY MAPPING

(71) Applicant: Dell Products L.P., Round Rock, TX (US)

(72) Inventors: Krishnaprasad Koladi, Bangalore (IN); Shiva Prasad Katta, Bangalore (IN); Rudramuni Basavarajappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/616,927

(22) Filed: Feb. 9, 2015

(65) Prior Publication Data
US 2016/0232023 A1 Aug. 11, 2016

(51) Int. Cl.
*G06F 9/455* (2006.01)
(52) U.S. Cl.
CPC .. *G06F 9/45558* (2013.01); *G06F 2009/4557* (2013.01); *G06F 2009/45575* (2013.01)
(58) Field of Classification Search
CPC .................. G06F 9/45558; G06F 2009/45566
See application file for complete search history.

(56) References Cited

U.S. PATENT DOCUMENTS

| | | | | |
|---|---|---|---|---|
| 8,819,673 | B1 * | 8/2014 | Wilkinson | G06F 9/45558 718/1 |
| 2008/0189700 | A1 * | 8/2008 | Schmidt | G06F 11/203 718/1 |
| 2011/0271280 | A1 * | 11/2011 | Cao | G06F 9/485 718/1 |
| 2013/0283090 | A1 * | 10/2013 | Bradley | G06F 11/0793 714/2 |
| 2014/0215073 | A1 * | 7/2014 | Dow | H04L 67/10 709/226 |
| 2016/0127509 | A1 * | 5/2016 | Uriel | H04L 67/40 709/203 |

OTHER PUBLICATIONS

Apte et al., "Look Who's Talking: Discovering Dependencies between Virtual Machines Using CPU Utilization", USENIX Conference 2010.*

* cited by examiner

*Primary Examiner* — Lewis A Bullock, Jr.
*Assistant Examiner* — Bruce S Ashley
(74) *Attorney, Agent, or Firm* — Jackson Walker L.L.P.

(57) ABSTRACT

In accordance with these and other embodiments of the present disclosure, a system may include a processor and a hypervisor comprising a program of executable instructions embodied in non-transitory computer-readable media accessible to the processor. The hypervisor may be configured to, when read and executed by the processor: instantiate one or more virtual machines to execute on the hypervisor; maintain a virtual machine dependency map having one or more entries, each entry setting forth a target virtual machine and one or more virtual machines to which the target virtual machine is dependent; and determine whether to power on a target virtual machine based on information set forth in the virtual machine dependency map.

21 Claims, 4 Drawing Sheets

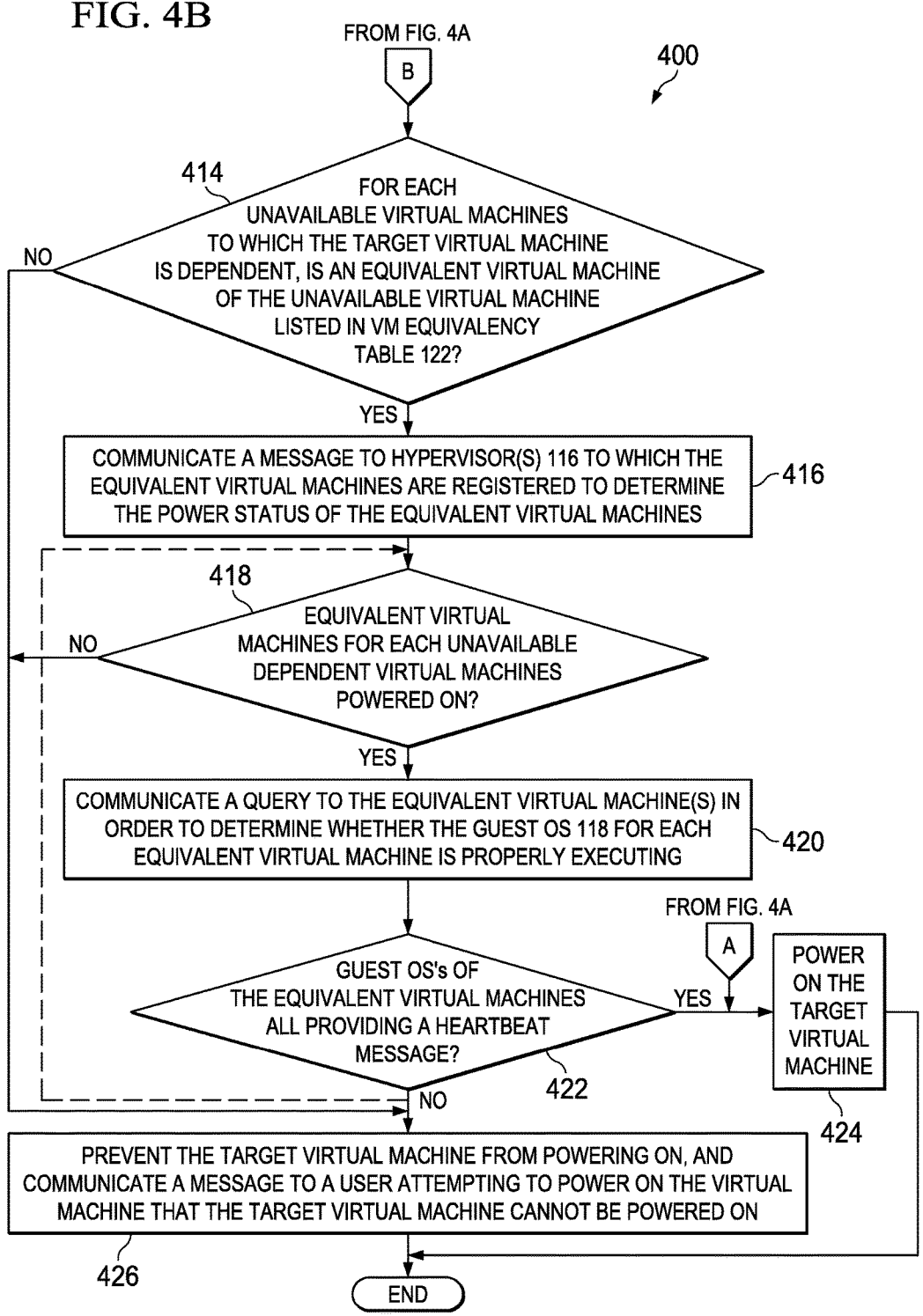

SYSTEMS AND METHODS FOR DEFINING VIRTUAL MACHINE DEPENDENCY MAPPING

TECHNICAL FIELD

The present disclosure relates in general to information handling systems, and more particularly to live migration of virtual machines across virtual storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system includes a hypervisor for hosting one or more virtual machines. A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Each virtual machine may be a standalone entity from the standpoint of its existence. In a networked environment, numerous virtual machines may be instantiated on a hypervisor to serve various services. Using traditional approaches, dependencies among virtual machines are typically not mapped or otherwise tracked.

SUMMARY

In accordance with the teachings of the present disclosure, the disadvantages and problems associated with virtual machines in a networked environment may be reduced or eliminated.

In accordance with these and other embodiments of the present disclosure, a system may include a processor and a hypervisor comprising a program of executable instructions embodied in non-transitory computer-readable media accessible to the processor. The hypervisor may be configured to, when read and executed by the processor: instantiate one or more virtual machines to execute on the hypervisor; maintain a virtual machine dependency map having one or more entries, each entry setting forth a target virtual machine and one or more virtual machines to which the target virtual machine is dependent; and determine whether to power on a target virtual machine based on information set forth in the virtual machine dependency map.

In accordance with these and other embodiments of the present disclosure, a method may include instantiating one or more virtual machines to execute on a hypervisor. The method may also include maintaining a virtual machine dependency map having one or more entries, each entry setting forth a target virtual machine and one or more virtual machines to which the target virtual machine is dependent. The method may further include determining whether to power on a target virtual machine based on information set forth in the virtual machine dependency map.

In accordance with these and other embodiments of the present disclosure, an article of manufacture may include a non-transitory computer readable medium and computer-executable instructions carried on the computer readable medium, the instructions readable by a processor. The instructions, when read and executed, may cause the processor to: instantiate one or more virtual machines to execute on the hypervisor; maintain a virtual machine dependency map having one or more entries, each entry setting forth a target virtual machine and one or more virtual machines to which the target virtual machine is dependent; and determine whether to power on a target virtual machine based on information set forth in the virtual machine dependency map.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 4A and 4B illustrate a flow chart of an example method for powering on a virtual machine based on dependency mapping, in accordance with embodiments of the present disclosure.

DETAILED DESCRIPTION

Figure 1:
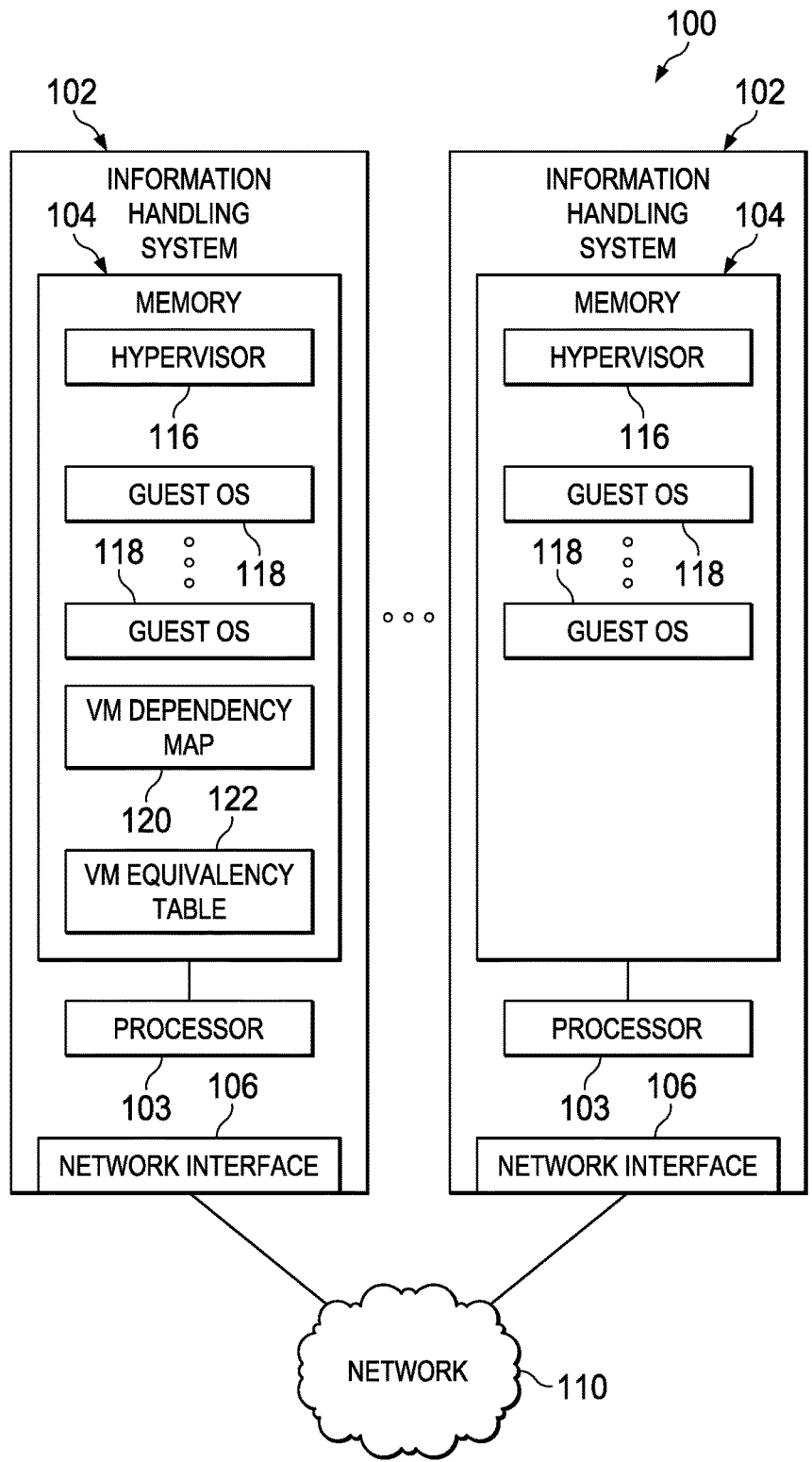
FIG. 1 illustrates a block diagram of an example system of networked information handling systems, in accordance with embodiments of the present disclosure.

Preferred embodiments and their advantages are best understood by reference to FIGS. 1 through 4B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 of networked information handling systems 102, in accordance with embodiments of the present disclosure. As shown in FIG. 1, system 100 may include a plurality of information handling systems 102 coupled to one another via a network 110.

In some embodiments, an information handling system 102 may comprise a server. In these and other embodiments, an information handling system 102 may comprise a personal computer. In other embodiments, an information handling system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, and a network interface 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or other computer-readable media accessible to processor 103.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, a memory 104 may have stored thereon a hypervisor 116 and one or more guest operating systems (OS) 118. In some embodiments, hypervisor 116 and one or more of guest OS's 118 may be stored in a computer-readable medium (e.g., a local or remote hard disk drive) other than memory 104 which is accessible to processor 102.

Hypervisor 116 may comprise software and/or firmware generally operable to allow multiple virtual machines and/or operating systems to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. Hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 116 may comprise a specially-designed OS with native virtualization capabilities. In another embodiment, hypervisor 116 may comprise a standard OS with an incorporated virtualization component for performing virtualization.

In another embodiment, hypervisor 116 may comprise a standard OS running alongside a separate virtualization application. In this embodiment, the virtualization application of hypervisor 116 may be an application running above the OS and interacting with computing system resources only through the OS. Alternatively, the virtualization application of hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality.

Figure 2:
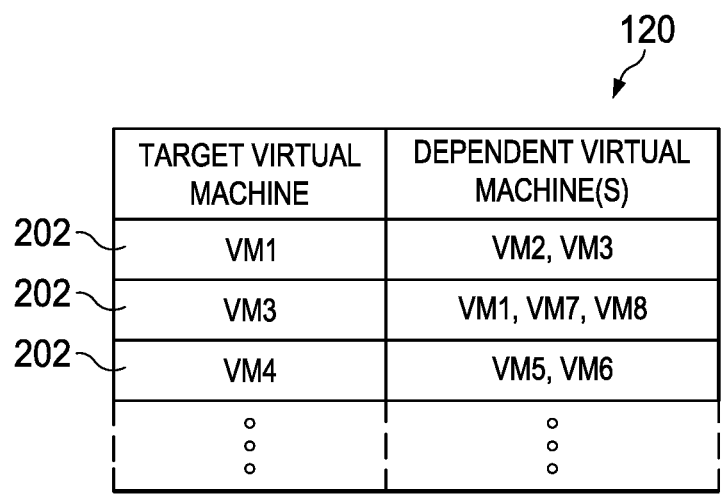
FIG. 2 illustrates an example dependency map for virtual machines instantiated by hypervisors within the system of FIG. 1, in accordance with embodiments of the present disclosure.

At least one information handling system 102 in system 100 may have stored within its memory 104 a virtual machine (VM) dependency map 120. VM dependency map 120 may comprise a table, list, array, or other suitable data structure including one or more entries 202, wherein each entry 202 sets forth a target virtual machine and one or more virtual machines to which the target virtual machine is dependent. FIG. 2 illustrates an example dependency map 120 for virtual machines instantiated by hypervisors 116 within system 100, in accordance with embodiments of the present disclosure. As shown in FIG. 2, each entry 202 of dependency map 120 may include a particular "target" virtual machine and one or more other virtual machines to which the target virtual machine is dependent.

Figure 3:
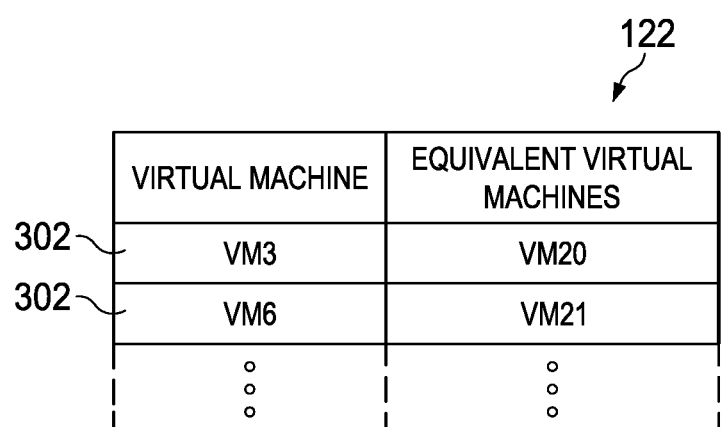
FIG. 3 illustrates an example equivalency table for virtual machines instantiated by hypervisors within the system of FIG. 1, in accordance with embodiments of the present disclosure.

At least one information handling system 102 in system 100 may have stored within its memory 104 a VM equivalency table 122. VM equivalency table 122 may comprise a table, list, array, or other suitable data structure including one or more entries 302, wherein each entry 302 sets forth a particular virtual machine and one or more other virtual machines to which the particular virtual machine is equivalent. FIG. 3 illustrates an example VM equivalency table 122 for virtual machines instantiated by hypervisors 116 within system 100, in accordance with embodiments of the present disclosure. As shown in FIG. 3, each entry 302 of equivalency table 122 may include a particular virtual machine and one or more other virtual machines to which the particular virtual machine is equivalent. For example, if a first virtual machine is able to provide the same or similar services to a second virtual machine, the first virtual machine may be said to be equivalent to the second virtual machine.

When a user instantiates a virtual machine via a hypervisor 116, the hypervisor 116 may allow the user to select any other virtual machines to which the newly-instantiated virtual machine will be dependent. By designating a virtual machine as "dependent" on another, the user has indicated that the services performed by a newly-created target virtual machine will be dependent on services performed by the virtual machine(s) designated as being dependencies from the target virtual machine. When a new target virtual machine is created, a hypervisor 116 may update the VM dependency map 120. When entries are added to VM dependency map 120, a hypervisor 116 may perform checks to avoid creation of circular dependencies. VM dependency map 120 may be dynamic in the sense that it is updated as new entries with new dependencies may be entered, existing entries may be edited, and existing entries may be deleted when an existing virtual machine is unregistered.

A network interface 106 may include any suitable system, apparatus, or device operable to serve as an interface between an associated information handling system 102 and network 110. Network interface 106 may enable its associated information handling system 102 to communicate with the external network using any suitable transmission protocol (e.g., TCP/IP) and/or standard (e.g., IEEE 802.11, Wi-Fi). In certain embodiments, network interface 106 may include a physical NIC. In the same or alternative embodiments, network interface 106 may be configured to communicate via wireless transmissions. In the same or alternative embodiments, network interface 106 may provide physical access to a networking medium and/or provide a low-level addressing system (e.g., through the use of Media Access Control addresses). In some embodiments, network interface 106 may be implemented as a local area network ("LAN") on motherboard ("LOM") interface. Network interface 106 may comprise one or more suitable network interface cards, including without limitation, mezzanine cards, network daughter cards, etc.

Network 110 may be a network and/or fabric configured to communicatively couple information handling systems to each other. In certain embodiments, network 110 may include a communication infrastructure, which provides physical connections, and a management layer, which organizes the physical connections of information handling systems 102 and other devices coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

In addition to processor 103, memory 104, and network interface 106, information handling system 102 may include one or more other information handling resources.

Figure 4A:
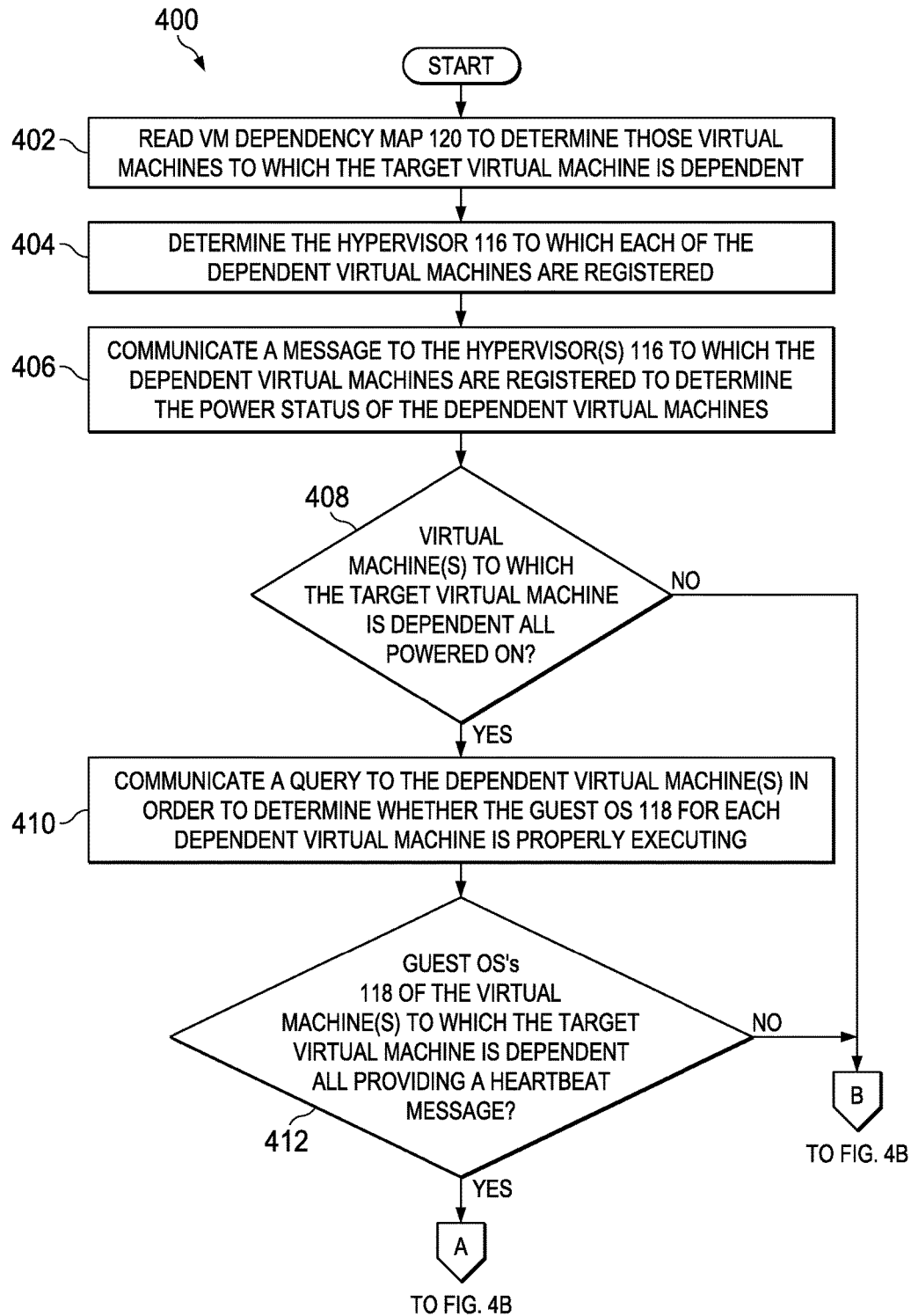

FIGS. 4A and 4B illustrate a flow chart of an example method for powering on a virtual machine based on dependency mapping, in accordance with embodiments of the present disclosure. According to certain embodiments, method 400 may begin at step 402. As noted above, teachings of the present disclosure may be implemented in a variety of configurations of system 100 as shown in FIG. 1. As such, the preferred initialization point for method 400 and the order of the steps comprising method 400 may depend on the implementation chosen.

At step 402, in response to a command or other indication to power on a target virtual machine, a hypervisor 116 may read VM dependency map 120 to determine those virtual machines to which the target virtual machine is dependent. At step 404, the hypervisor 116 may determine the hypervisor 116 to which each of the dependent virtual machines are registered. At step 406, the hypervisor 116 may communicate a message to the hypervisor(s) 116 to which the dependent virtual machines are registered to determine the power status of the dependent virtual machines. Such message may include a power status function command supported by application programming interfaces of the hypervisors 116.

At step 408, the hypervisor 116 to which the target virtual machine is registered may determine if the virtual machine(s) to which the target virtual machine is dependent are all powered on. If all such virtual machines are powered on, method 400 may proceed to step 410. Otherwise method 400 may proceed to step 414.

At step 410, in response to the virtual machine(s) to which the target virtual machine is dependent all being powered on, hypervisor 116 on which the target virtual machine is registered may communicate a query (e.g., a command to fetch a heartbeat status) to the dependent virtual machine(s) in order to determine whether the guest OS 118 for each dependent virtual machine is properly executing. Such message may include a "get heartbeat status" command supported by application programming interfaces of the hypervisors 116.

At step 412, hypervisor 116 to which the target virtual machine is registered may determine if guest OS's 118 of the virtual machine(s) to which the target virtual machine is dependent are all providing a heartbeat message. If all such virtual machines are providing a heartbeat message, method 400 may proceed to step 424. Otherwise method 400 may proceed to step 414.

At step 414, for each unavailable virtual machine to which the target virtual machine is dependent, a hypervisor 116 may determine from virtual machine equivalency table 122 whether an equivalent virtual machine exists for the unavailable dependent virtual machine. If an equivalent virtual machine does not exist for one or more of the unavailable dependent virtual machines, method 400 may proceed to step 426. Otherwise, method 400 may proceed to step 416.

At step 416, hypervisor 116 of the target virtual machine may communicate a message to the hypervisor(s) 116 to which the equivalent virtual machines are registered to determine the power status of the equivalent virtual machines. Such message may include a power status function command supported by application programming interfaces of the hypervisors 116.

At step 418, the hypervisor 116 to which the target virtual machine is registered may determine if the equivalent virtual machine(s) of the virtual machines(s) to which the target virtual machine is dependent are all powered on. If all such equivalent virtual machines are powered on, method 400 may proceed to step 420. Otherwise method 400 may proceed to step 426.

At step 420, in response to the equivalent virtual machine(s) all being powered on, hypervisor 116 on which the target virtual machine is registered may communicate a query (e.g., a command to fetch a heartbeat status) to the equivalent virtual machine(s) in order to determine whether the guest OS 118 for each equivalent virtual machine is properly executing. Such message may include a "get heartbeat status" command supported by application programming interfaces of the hypervisors 116.

At step 422, hypervisor 116 to which the target virtual machine is registered may determine if guest OS's 118 of the equivalent virtual machine(s) of the virtual machines(s) to which the target virtual machine is dependent are all providing a heartbeat message. If all such virtual machines are providing a heartbeat message, method 400 may proceed to step 424. Otherwise method 400 may proceed to step 426.

At step 424, in response to the virtual machine(s) to which the target virtual machine is dependent all having operational guest OS's 118, hypervisor 116 to which the target virtual machine is registered may power on the target virtual machine. After completion of step 424, method 400 may end.

At step 426, hypervisor 116 may prevent the target virtual machine from powering on, and communicate a message to a user attempting to power on the virtual machine that the target virtual machine cannot be powered on. After completion of step 426, method 400 may end. However, in situations in which multiple equivalent virtual machines for a dependent virtual machine is available and step 426 is reached because an equivalent virtual machine of a dependent virtual machine fails (e.g., not powered on or providing heartbeat message) steps 418 through 422 may be repeated for each equivalent virtual machine until an available equivalent virtual machine is found, or until all equivalent virtual machines have been determined to be powered off or without a heartbeat.

Although FIGS. 4A and 4B disclose a particular number of steps to be taken with respect to method 400, it may be executed with greater or lesser steps than those depicted in FIGS. 4A and 4B. In addition, although FIGS. 4A and 4B disclose a certain order of steps to be taken with respect to method 400, the steps comprising method 400 may be completed in any suitable order.

Method 400 may be implemented using system 100, components thereof or any other system such as those shown in FIG. 1 operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, performed by a hypervisor, for instantiating virtual machines to perform operations, the method comprising:
    maintaining a virtual machine dependency map, the virtual machine dependency map having a plurality of entries, each of the plurality of entries indicating a target virtual machine and one or more other virtual machines upon which the target virtual machine is dependent;
    responsive to receiving a power on command for a first virtual machine, performing dependency check operations comprising:
    determining, from the virtual machine dependency map, depended-upon virtual machines upon which the first virtual machine is dependent;
    determining whether the depended-upon virtual machines include one or more non-operational virtual machines wherein a non-operational virtual machine includes:
        a virtual machine in a powered off state; and
        a virtual machine with a non-functional guest operating system;
    responsive to determining that the depended-upon virtual machines do not include any non-operational virtual machines, executing the power on command;
    responsive to determining that the depended-upon virtual machines include one or more non-operational virtual machines, determining whether an equivalent virtual machine exists for each of the one or more non-operational virtual machines;
    responsive to determining that that no equivalent virtual machine exists for one or more of the non-operational virtual machines, preventing the power on command from executing;
    responsive to determining that at least one operational, equivalent virtual machine exists for each non-operational virtual machine, executing the power on command.

2. The method of claim 1, wherein determining whether the depended-upon virtual machines include one or more non-operational virtual machine comprises:
    communicating a power status message to a hypervisor of each depended-upon virtual machine to determine whether the depended-upon virtual machines include one or more virtual machine in a powered off state.

3. The method of claim 1, wherein determining whether the depended-upon virtual machines include one or more non-operational virtual machine comprises:
    communicating a command to fetch a heartbeat status of the depended-upon virtual machine to determine whether the depended-upon virtual machines include one or more virtual machines with a non-functional guest operating system.

4. The method of claim 1, further comprising:
    maintaining a virtual machine equivalency table, the virtual machine equivalency table having a plurality of entries, each of the plurality of entries indicating a particular virtual machine and one or more other virtual machines equivalent to the particular virtual machine, wherein determining whether an equivalent virtual machine exists for each of the one or more non-operational virtual machines includes determining from the virtual machine equivalency table.

5. The method of claim 4, further comprising:
    determining whether one or more of the equivalent virtual machines include a virtual machine in a powered off state.

6. The method of claim 4, further comprising:
    determining whether the one or more of the equivalent virtual machines include a virtual machine with a non-functioning guest operating system.

7. The method of claim 1, wherein the processor is associated with a first information handling system coupled to a network and wherein the system includes hypervisors of a plurality of additional information handling systems coupled to the network.

8. A system comprising:
    a processor; and
    a first hypervisor for instantiating virtual machines, the first hypervisor comprising a program of executable instructions embodied in non-transitory computer-readable media accessible to the processor, and configured to, when read and executed by the processor cause the processor to perform operations comprising:
    maintaining a virtual machine dependency map, the virtual machine dependency map having a plurality of entries, each of the plurality of entries indicating a target virtual machine and one or more other virtual machines upon which the target virtual machine is dependent;
    responsive to receiving a power on command for a first virtual machine, performing dependency check operations comprising:
    determining, from the virtual machine dependency map, depended-upon virtual machines upon which the first virtual machine is dependent;
    determining whether the depended-upon virtual machines include one or more non-operational virtual machines wherein a non-operational virtual machine includes:
        a virtual machine in a powered off state; and
        a virtual machine with a non-functional guest operating system;
    responsive to determining that the depended-upon virtual machines do not include any non-operational virtual machines, executing the power on command;
    responsive to determining that the depended-upon virtual machines include one or more non-operational virtual machines, determining whether an equivalent virtual machine exists for each of the one or more non-operational virtual machines;
    responsive to determining that that no equivalent virtual machine exists for one or more of the non-operational virtual machines, preventing the power on command from executing;

responsive to determining that at least one operational, equivalent virtual machine exists for each non-operational virtual machine, executing the power on command.

9. The system of claim 1, wherein determining whether the depended-upon virtual machines include one or more virtual machines in a powered off state includes communicating a power status message to a hypervisor of each depended-upon virtual machine.

10. The system of claim 1, wherein determining whether the depended-upon virtual machines include one or more virtual machine within a non-functional guest operating system includes communicating a command to fetch a heartbeat status of the depended-upon virtual machine.

11. The system of claim 1, wherein the processor is associated with a first information handling system coupled to a network and wherein the system includes hypervisors of a plurality of additional information handling systems coupled to the network.

12. The system of claim 10, further comprising:
maintaining a virtual machine equivalency table, the virtual machine dependency map having a plurality of entries, each of the plurality of entries indicating a particular virtual machine and one or more other virtual machines equivalent to the particular virtual machine, wherein determining whether an equivalent virtual machine exists for each of the one or more non-operational virtual machines includes determining from the virtual machine equivalency table.

13. The system of claim 12, further comprising:
determining whether one or more of the equivalent virtual machines include a virtual machine in a powered off state.

14. The system of claim 12, further comprising:
determining whether the one or more of the equivalent virtual machines include a virtual machine with a non-functioning guest operating system.

15. An article of manufacture comprising: a non-transitory computer readable medium; and
computer-executable instructions carried on the computer readable medium, the instructions readable by a processor, the instructions, when read and executed by the processor, causing the processor to perform hypervisor operations for instantiating virtual machines, the hypervisor operations comprising:
maintaining a virtual machine dependency map, the virtual machine dependency map having a plurality of entries, each of the plurality of entries indicating a target virtual machine and one or more other virtual machines upon which the target virtual machine is dependent;
responsive to receiving a power on command for a first virtual machine, performing dependency check operations comprising:
determining, from the virtual machine dependency map, depended-upon virtual machines upon which the first virtual machine is dependent; and
determining whether the depended-upon virtual machines include one or more non-operational virtual machines wherein a non-operational virtual machine includes:
a virtual machine in a powered off state; and
a virtual machine with a non-functional guest operating system;
responsive to determining that the depended-upon virtual machines do not include any non-operational virtual machines, executing the power on command;
responsive to determining that the depended-upon virtual machines include one or more non-operational virtual machines, determining whether an equivalent virtual machine exists for each of the one or more non-operational virtual machines;
responsive to determining that that no equivalent virtual machine exists for one or more of the non-operational virtual machines, preventing the power on command from executing; and
responsive to determining that at least one operational, equivalent virtual machine exists for each non-operational virtual machine, executing the power on command.

16. The article of manufacture of claim 15, wherein determining whether to send a power on command to the target virtual machine includes:
sending the power on command only if each of the depended-upon virtual machines has a powered on status.

17. The article of manufacture of claim 16, wherein determining whether to send a power on command to the target virtual machine further includes:
sending the power on command only if each of the guest operating systems has a functional status.

18. The article of manufacture of claim 17, wherein determining whether to send a power on command further comprises determining, for each depended-upon virtual machine that does not have a powered on status and a functional status, whether an equivalent virtual machine exists for the depended-upon virtual machine.

19. The article of manufacture of claim 18, wherein determining whether to send a power on command comprises determining a powered on status and functional status of each equivalent virtual machine.

20. The article of manufacture of claim 19, wherein the operations include:
maintaining an equivalency map for the plurality of virtual machines, the equivalency map having a plurality of entries, each of the plurality of entries setting forth a target virtual machine and one or more equivalent virtual machines comprising virtual machines with functionality equivalent to target virtual machine.

21. The article of manufacture of claim 15, wherein services performed by the target virtual machine are dependent on services performed by the depended-upon virtual machines.

* * * * *

UNITED STATES PATENT AND TRADEMARK OFFICE
CERTIFICATE OF CORRECTION

PATENT NO. : 9,870,246 B2
APPLICATION NO. : 14/616927
DATED : January 16, 2018
INVENTOR(S) : Krishnaprasad Koladi et al.

It is certified that error appears in the above-identified patent and that said Letters Patent is hereby corrected as shown below:

In the Claims

Please amend Claim 9 as follows:
9. The system of Claim 8, wherein determining whether the depended-upon virtual machines include one or more virtual machines in a powered off state includes communicating a power status message to a hypervisor of each depended-upon virtual machine.

Please amend Claim 10 as follows:
10. The system of Claim 8, wherein determining whether the depended-upon virtual machines include one or more virtual machine within a non-functional guest operating system includes communicating a command to fetch a heartbeat status of the depended-upon virtual machine.

Please amend Claim 11 as follows:
11. The system of Claim 8, wherein the processor is associated with a first information handling system coupled to a network and wherein the system includes hypervisors of a plurality of additional information handling systems coupled to the network.

Signed and Sealed this
Nineteenth Day of June, 2018

Andrei Iancu
*Director of the United States Patent and Trademark Office*